AUXILLIARY PARACHUTE FOR AERIAL RECOVERY

Original Filed Dec. 26, 1963 3 Sheets-Sheet 1

Otis B. Ferguson
INVENTOR.
BY Johnson O'Brien and Harvey R. Jackson Attorneys

AUXILLIARY PARACHUTE FOR AERIAL RECOVERY

Original Filed Dec. 26, 1963 3 Sheets-Sheet 2

Otis B. Ferguson
INVENTOR.

BY Clarence A. O'Brien and Harvey B. Jacobson
Attorneys

AUXILLIARY PARACHUTE FOR AERIAL RECOVERY

Original Filed Dec. 26, 1963 3 Sheets-Sheet 3

Otis B. Ferguson
INVENTOR.

BY Clarence A. O'Brien and Harvey B. Jacobson
Attorneys

United States Patent Office

Re. 26,865
Reissued Apr. 21, 1970

26,865

AUXILIARY PARACHUTE FOR AERIAL RECOVERY

Otis B. Ferguson, Alamogordo, N. Mex., assignor to Recovery Research Systems, Inc., Alamogordo, N. Mex., a corporation of New Mexico Original No. 3,227,403, dated Jan. 4, 1966, Ser. No. 333,301, Dec. 26, 1963. Application for reissue June 26, 1967, Ser. No. 659,823
Int. Cl. B64d *17/04, 17/08*
U.S. Cl. 244—145 11 Claims

Matter enclosed in heavy brackets [ ] appears in the original patent but forms no part of this reissue specification; matter printed in italics indicates the additions made by reissue.

*ABSTRACT OF THE DISCLOSURE*

*Parachute air recovery apparatus having engagement means on canopy to form pickup areas or target while airborne and suspension portion associated with engagement means at spaced points and attached to payload to bear or support payload from above when engaged and carried by recovery forces. Main load bearing engagement means having portion on canopy and portion extending to payload to directly connect pickup device to payload and secondary portion of load bearing portion in a circumferential arrangement on canopy forming further pickup areas or target and extending in an over and under relation at spaced points of interconnection with portions of main engagement means distributing weight of payload and decreasing likelihood of breakage of engagement means during engagement and carriage by recovery aircraft.*

The present invention relates generally to improvements in the technique of aerial recovery or pick up of a pay load or package and more particularly relates to a device generally in the form of an auxiliary parachute employed for supporting an elongated load line in a position extending above the main load supporting parachute in order to provide a means by which recovery machinery within the recovery aircraft may be safely and reliably engaged with the auxiliary parachute thereby facilitating mid-air recovery of a package or pay load.

An object of the present invention is to provide improved facilities and techniques in mid-air or aerial recovery or pick up of a load that is supported by one or more main load carrying or supporting parachutes incorporating an auxiliary parachute having a load line suspended therefrom that is attached to the pay load with the main load carrying parachute system located between the pay load and the auxiliary parachute with the auxiliary parachute having a high lift or drag coefficient so that it will have a rate of descent slower than can be reasonably assumed for the main parachute system so that the pick up hook mechanism may be engaged with the auxiliary parachute.

Another object of the present invention is to provide an auxiliary parachute in accordance with the preceding object that is substantially in the form of a square parachute which due to its particular configuration enables some of the entrapped air to escape rather easily thereby eliminating oscillation of the parachute for forming a more stable target for pick up mechanisms. This structural arrangement also substantially reduces or eliminates horizontal drift, rotation and spin.

A further object of the present invention is to provide an auxiliary parachute in accordance with the preceding objects in which the canopy material is constructed of low porosity weave for providing the high drag coefficient with the canopy material being sufficiently strong to withstand the opening forces and aid the main parachute system in supporting the weight of the pay load. The canopy material is provided with reinforcing bands of relatively strong webbing which provides strength to support the weight of the pay load when the reinforcing bands are engaged in the pick up hook assembly. The reinforcing bands are interlocked with each other to assure a secure hook up with the recovery hook system even in the event of heavy damage to the auxiliary parachute device. Further, the reinforcing bands are constructed and arranged in a manner to engage the pick up hook assembly and prevent a fake engagement of the hook assembly in the weaker canopy material which could pull out during engagement and subsequent lifting of the pay load.

Still another object of the present invention is to provide an auxiliary parachute in which load transfer loops are affixed to the reinforcing ends so that when the load is reeled into the pick up aircraft, the transfer loops may be engaged with auxiliary hook assemblies within the aircraft for supporting the pay load thereby permitting personnel of the pick up aircraft to disengage the hook assembly from the auxiliary parachute and remove them from the winch line of the recovery machinery so that the hook assemblies will not have to ride over the winch of the recovery machinery and come in contact with the reel drum.

Still another feature of the present invention is the provision of an auxiliary parachute in accordance with the preceding objects incorporating a small weight disposed adjacent the apex of the suspension line thereby rendering the auxiliary parachute independent of the main parachute and load line insuring and maintaining full inflation of the auxiliary parachute under minimum rate of descent conditions. Yet another object of the invention is to provide an auxiliary parachute which may be constructed of contrasting colors for ease of visual observation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
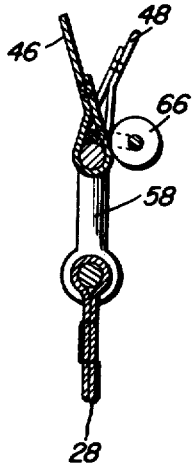
Figure 2:
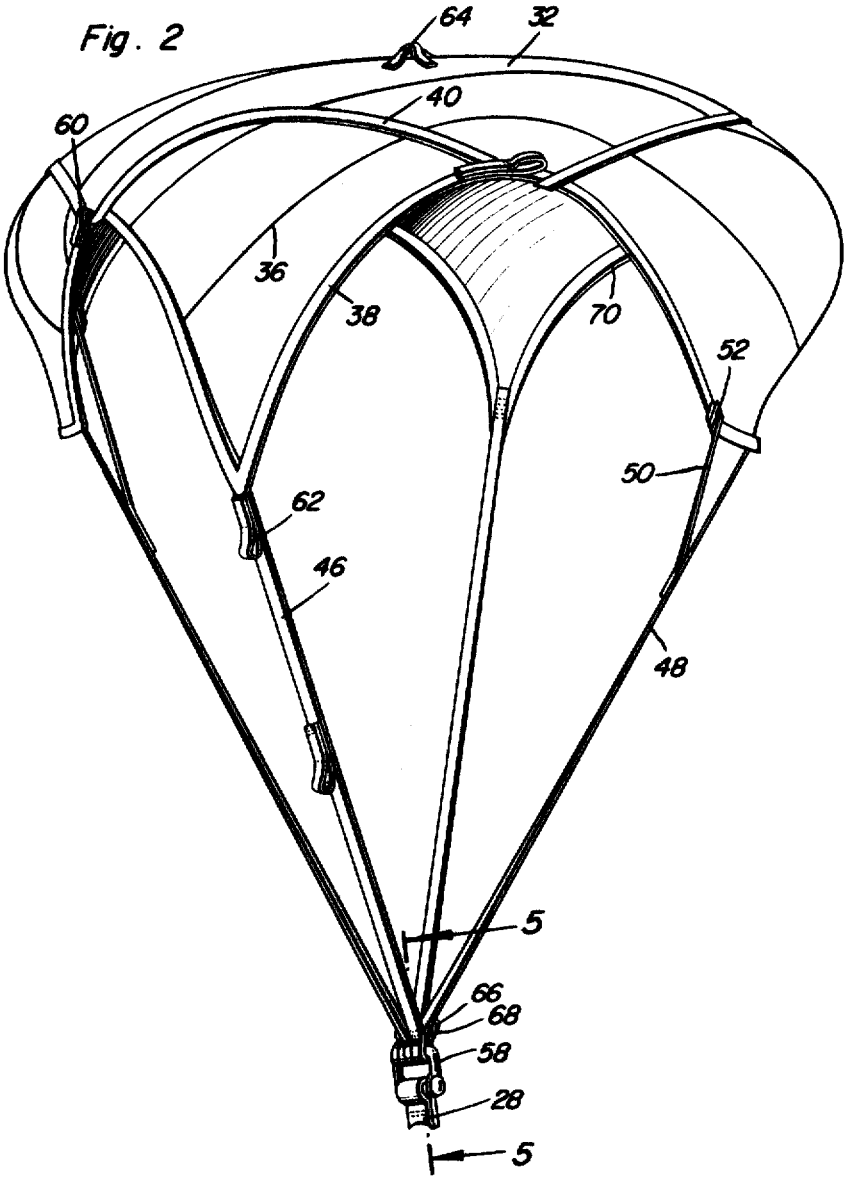
FIG. 2 is a side elevational view of the auxiliary parachute of the present invention.
Figure 4:
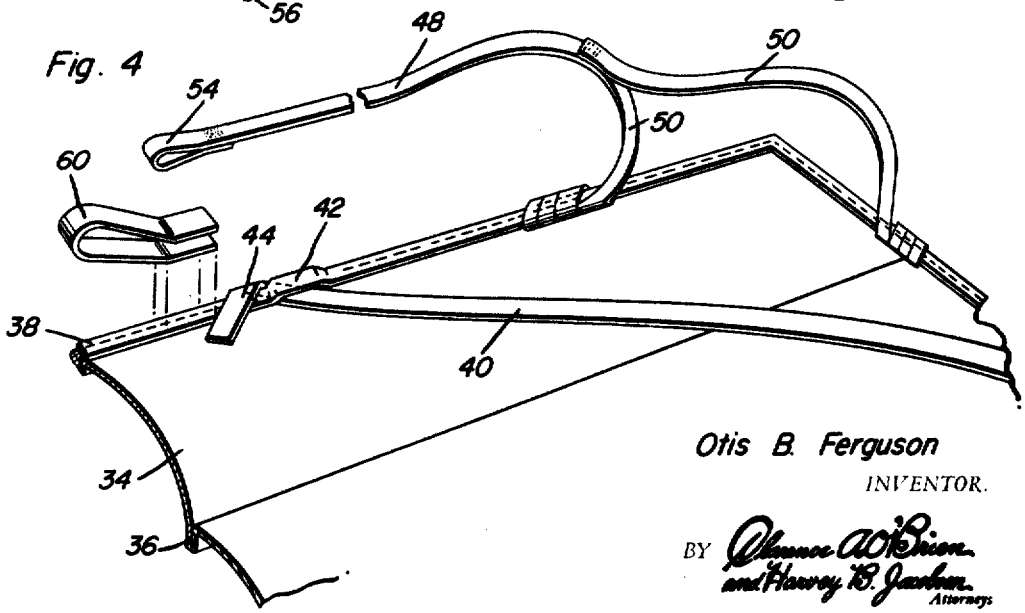

FIG. 4 is an exploded group perspective view illustrating certain of the assembly details of the auxiliary parachute; and FIG. 5 is a detailed sectional view taken substantially upon a plane passing along section line 5—5 of FIG. 2 illustrating the manner in which the auxiliary parachute is attached to the load line and the weight is attached to the apex of the suspension system for the auxiliary parachute.

Referring now specifically to the drawings, the auxiliary parachute device of the present invention is designated by numeral 10 and is associated with the main parachute or parachute system 12 for supporting a pay load 14 for assisting in the aerial recovery or pick up of the pay load 14 by use of a hook assembly 16 supported by and from a recovery machinery assembly in a pick up or recovery aircraft (not shown).

The hook assembly 16 includes a flexible line 18 and a gang hook including a plurality of hook members 20 connected with a common shank 22 which generally is in the nature of a multiple hook grapple assembly. The flexible line 18 is engaged with and wound onto and reeled from a suitable winch including a reel drum carried by the aircraft. The particular details of the winch mechanism, the aircraft and associated equipment forms no particular part of the present invention.

The main parachute 12 includes the usual canopy 24 and suspension line 26 connected with a load line 28 extending to and connected to the pay load 14 in a conventional manner. The pay load line 28 extends upwardly through an aperture 30 in the main parachute 24 and is continuous up to and is connected to the auxiliary parachute 10 of the present invention. While only a single parachute 24 has been illustrated, it is pointed out that the main support for the pay load may be a multiple parachute system if desired depending upon the pay load. The nature of the pay load may vary and the present invention has particular utility in recovery of space capsules or the like as they return toward the earth's surface so that such a capsule may be recovered in mid-air without any possibility of damage when it engages the ground surface or plunges into water. Of course, other pay loads may be picked up and the present invention also has utility in enabling recovery aircraft to pick up any load that has been discharged from another aircraft and is supported by the parachute assembly thus enabling various loads to be transferred from one aircraft to another in mid-air without the aircraft coming into close proximity to each other and without the aircraft having to land to pick up the load.

Figure 3:
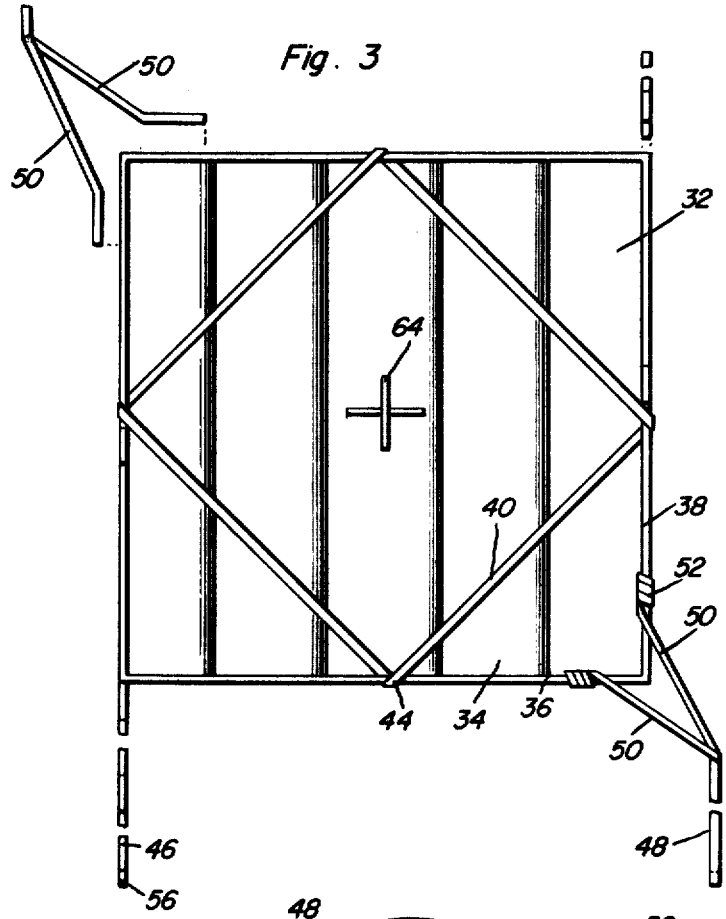
FIG. 3 is a plan view of the auxiliary parachute illustrating the parachute in planar condition.

As illustrated in FIGS. 2 and 3, the auxiliary parachute 10 includes a [generally square] parachute canopy 32 *illustrated in one form as of generally square shaping and* constructed of a plurality of sections 34 sewn together by longitudinal seams or rows of stitching 36 as illustrated in FIG. 4. The section seams 36 are parallel and mutually spaced from each other and the canopy material is very strong low porosity weave in order to minimize opening shock damage and the low porosity weave produces a very low rate of descent so that the auxiliary parachute 10 will fly above the main parachute 12 at all times with the particular construction of the auxiliary parachute assuring that the auxiliary parachute will have a lift coefficient that is better than the main parachute 12.

Attached to the perimeter of *or in circumferential arrangement with* the canopy 32 is a main supporting *or load bearing* loop *or endless member* 38 *secured or* stitched thereto in any suitable manner with the main supporting loop 38 being very strong and capable of supporting the entire pay load 14 throughout recovery forces. *Stated another way, member 38 and associated suspension members 46 and 48 and secondary member 40, hereafter described, are of a strength capable of supporting the pay load when engaged and carried by air recovery forces from above.* Another function of the main load supporting loop 38 is to form a reinforcing band [for] *adjacent* the [canpoy] *canopy* skirt to prevent rips and tears at this point.

Figure 1:
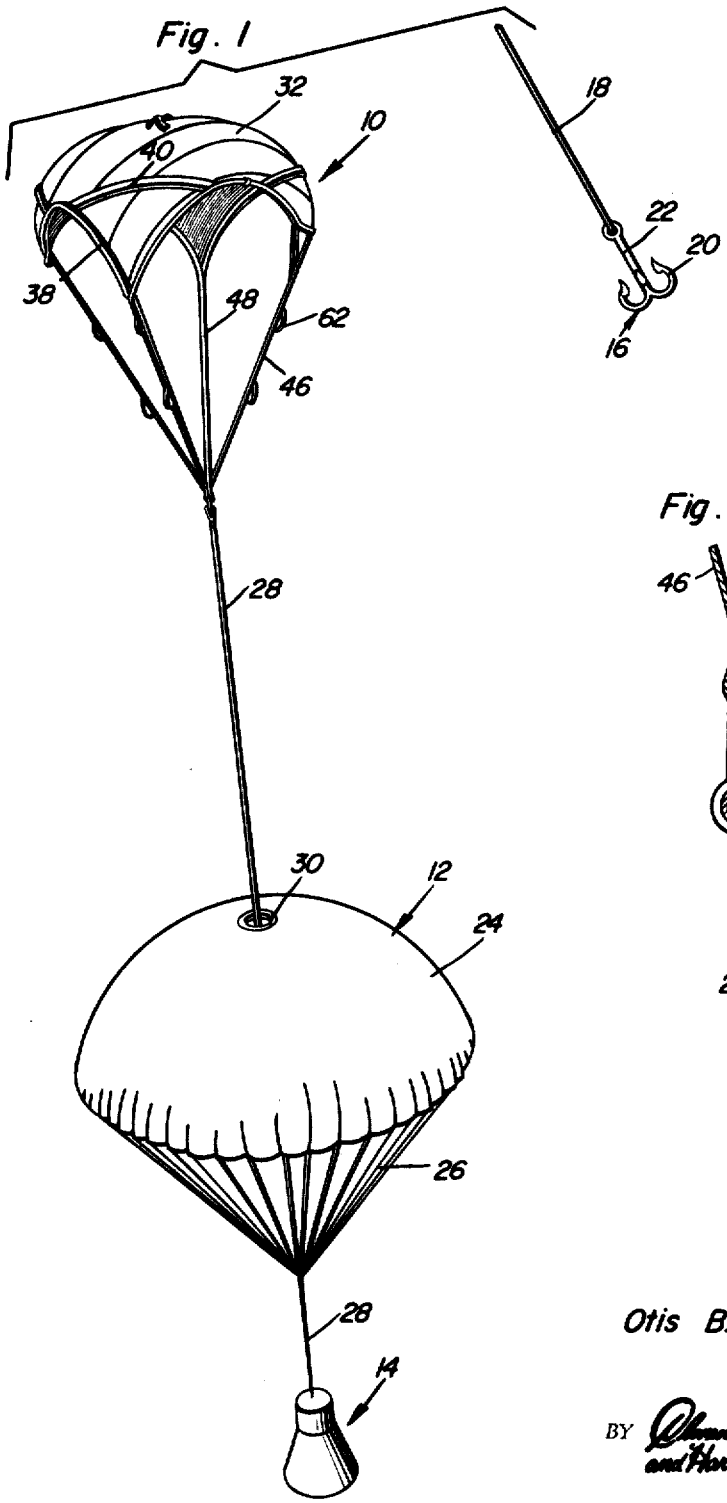
FIG. 1 is a schematic perspective view illustrating the auxiliary parachute of the present invention associated with a pay load and the main parachute together with a pick up hook assembly carried by a pick up aircraft.

A secondary load supporting *or load bearing* loop *or endless member* 40 having the same strength characteristics as the main supporting loop 38 is interlocked *or interconnected at spaced points along its lengthwise extent* with the main supporting loop *or endless member* 38 and sewn to the canopy material *to form a reinforcing assembly joined at spaced points and carried by the canopy. The portions of the secondary endless member 40 between the points of interconnection with the main endless member 38 are disposed inwardly of the outer edge of the canopy skirt, so as to be in spaced relationship with the main endless member 38 and be disposed for engagement by a hook pickup at an elevation above the main endless member 38 while airborne as shown in FIGS. 1 and 2.* The secondary loop 40 [defined in] *in one arrangement for the generally square canopy 32 is generally square in configuration and defines* a generally square area with the corners thereof orientated in the centers of the sides of the square main supporting loop 38 as illustrated in FIG. 3 and *in one form of interconnection therebetween* the supporting loop 40 extends under a portion 42 of the main supporting loop 38 and is reversely folded thereover as at 44 to form a connection between the secondary supporting loop 40 and the main supporting loop 38 *at a plurality of spaced points along said loop.*

[Diagonally] *Suspension lines 46 and 48 are secured at spaced points along the lengthwise extent of the reinforcing assembly and in one arrangement diagonally* opposed corners of the main supporting loop 38 form an extension of opposite side walls of the canopy and are designated by numeral 46 with the main load supporting loop extensions 46 being of a same strength characteristic for connection with the load line in a manner described hereinafter since they form two of the four canopy suspension lines.

The other two canopy suspension lines 48 have connecting components 50 attached thereto and the two connecting components 50 are engaged with the main supporting loop 38 in spaced relation to the corner thereof by virtue of the components 50 being wound about and attached to the main supporting loop as at 52 with the stitching serving to secure the two suspension lines 48 in place. The suspension lines 48 are of relatively light strength and serve only to form the necessary framework to keep the canopy 32 inflated. The suspension lines or the components 50 thereof are wrapped around the main load support loop webbing 38 a plurality of times and stitched in place by a suitable sewing machine. The end of each suspension line 48 is provided with a loop 54 and the end of each of the extensions 46 is provided with a comparable loop 56 which cooperate to form the apex of the suspension assembly and/or mounted on a generally loop-type clevis 58 that is, in turn, connected with the load lines 28 for attaching the auxiliary parachute 10 to the load line.

A plurality of load transfer loops 60 are attached to the main supporting loop webbing 38 by suitable stitching and also, a plurality of load transfer loops 62 are attached to the main supporting loop extensions 46. The load transfer loops 60 and 62 are made of the same material and of the same strength characteristics as the main load supporting loop 38.

At the center of the canopy 32, there is attached to the outer surface thereof a crossed loop assembly 64 sewn in place in any suitable manner and providing an upstanding loop where temporary ties or a pilot's chute may be attached to the auxiliary parachute to facilitate extraction of the packed auxiliary parachute from the container during deployment.

A small weight 66 is attached to the parachute 10 near the connecting clevis 58 and the weight may be supported in any suitable manner such as by a supporting loop 68 and the weight is the minimum necessary to maintain inflation of the auxiliary parachute and keeps the auxiliary parachute open when slack or when air currents lessen the weight or pull on the auxiliary parachute.

FIG. 2 illustrates the in-flight *or airborne* configuration of the auxiliary parachute in which the canopy 32 is very flat on top when inflated and four archways 70 are formed by the suspension lines and main load support loop extensions in such a manner that if the recovery hook assembly 16 is brought in contact with the archways 70, it must contact the main load supporting loop 38 and an ideal hook up is made. The secondary load loop *includes portions disposed at an elevation above the supporting loop 38 for engagement by the hook when carried above the adjoining portion of the supporting loop 38 and specif-*

*ically with the square canopy and interconnected loop configuration shown, loop 40* extends from the apex of the archways so that if the recovery hook is brought into contact with the parachute device between the archways *and above the adjoining portion of the supporting loop 38,* the hook will contact this reinforcement.

*In this arrangement as shown in FIGS. 1, 2 and 3 with the reinforcing assembly inclusive of the endless reinforcing members 38 and 40 being interconnected at spaced points along said members and the suspension lines 46 and 48 being connected at spaced points on this reinforcing assembly when a hook pickup engages the assembly the weight of the payload and the engagement shock is distributed between these spaced points of interconnection along the reinforcing assembly when the payload is suspended from the hook pickup device through the reinforcing members.* The canopy material, except when sewn to the main load support loop, is only lightly stitched so that contact with the hook will allow this material to break away from the load loops so that the hook may slide around the loop. However, in actual use, the hook penetrates the material very easily and rips it up to contact with the load loops so that eventually, the pick up hook assembly is securely connected or engaged with the load loops. Due to the stability of the parachute the hook will be easily engaged therewith and the build-up of excess air inside the canopy slips easily through the archways thus eliminating oscillation for further providing a stable target for the aircraft crew to aim for thus facilitating the aerial recovery of the pay load. The canopy may be constructed of contrasting materials in order to further provide easy visual observation thereof by the pick up aircraft crew.

After the hook assembly has been engaged with the auxiliary parachute, the winch mechanism within the aircraft reels the pay load in and the load transfer loops on the auxiliary parachute are connected to auxiliary hooks within the aircraft for supporting the pay load thereby permitting personnel of the aircraft to disengage the pick up assembly from the parachute device and remove the gang hooks from the winch line so that the gang hooks will not have to ride over the winch mechanism and come in contact with the winch reel drum thereby further facilitating the recovery of the pay load so that if desired, the pay load may be completely brought into the aircraft in a more expeditious and safe manner without any danger whatsoever of having the winch mechanism fouled by the gang hook assembly which is a rather bulky item and should not pass over the winch reel drum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a parachute system for carrying a suspended pay load which includes an auxiliary parachute for use in aerial recovery of the pay load and a main parachute for supporting the pay load prior to such recovery, the improvement comprising an auxiliary parachute having a generally square canopy, a *hook-engaging and load supporting means including a band* [reinforcing member] mounted [about] *around* the *entire* periphery of of the canopy for engagement by a hook pickup device carried by a pickup vehicle, downwardly converging suspension lines attached [at one end] to said [reinforcing member ] *band* at the corners of said canopy and *extending beyond the band* attached [at the other end] *directly* to a pay load supporting line, said canopy including archways formed by the sides thereof *and extending uninterruptedly from corner to corner* when a pay load is supported due to the corner connections of said suspension lines whereby a hook pickup device can readily contact the sides of said canopy and thereby engage the peripheral *band* [reinforcing member].

2. [The improvement of claim 1 wherein] *In a parachute system for carrying a suspended pay load which includes an auxiliary parachute for use in aerial recovery of the pay load and a main parachute for supporting the pay load prior to such recovery, the improvement comprising an auxiliary parachute having a generally square canopy, a reinforcing member mounted about the periphery of the canopy for engagement by a hook pickup device carried by a pickup vehicle, downwardly converging suspension lines attached at one end to said reinforcing member at the corners of said canopy and attached at the other end to a pay load supporting line, said canopy including archways formed by the sides thereof when a pay load is supported due to the corner connections of said suspension lines whereby a hook pickup device can readily contact the sides of said canopy and thereby engage the peripheral reinforcing member,* said canopy [is] *being* provided with a second reinforcing member of generally square configuration having the corners thereof looped around the midpoints of the sides of the first mentioned reinforcing member whereby a hook pickup device will engage a reinforcing member at any point about the periphery of the auxiliary parachute which it contacts.

3. The improvement of claim 1 wherein two diagonally opposed suspension lines form extensions of the peripheral reinforcing member for supporting the pay-load line.

[4. The improvement of claim 2 wherein said peripheral reinforcing member and the extension thereof forming two of the suspension lines include auxiliary load loops attached thereto for engagement with the winch machinery carried by the pickup aircraft.]

[5. The improvement of claim 2 wherein the auxiliary parachute has lift characteristics in excess of the lift characteristics of the main parachute for assuring that the auxiliary parachute will be disposed above the main parachute whereby the pickup hook may be engaged therewith without any danger of the pickup aircraft entangling with the main parachute.]

6. In a parachute system for carrying a suspended pay load which includes an auxiliary parachute for use in aerial recovery of the pay load and a main parachute for supporting the pay load prior to said recovery, the improvement comprising an auxiliary parachute having a canopy, [reinforcing] *hook-engaging and load supporting* means *including a band* mounted [about the] *around the entire* periphery of the canopy for engagement by a hook pickup device carried by a pickup vehicle, downwardly converging suspension lines attached [at one end] directly to said [reinforcing means] *band* at spaced points about said canopy and attached [at the other end] *directly* to a pay load supporting line, said canopy having pickup areas, spanned by said [reinforcing means] *band,* formed between adjacent suspension lines *and extending uninterruptedly from suspension line to suspension line* for accommodating a hook pickup device thereby directly suspending the pay load from the hook pickup device through the [reinforcing means] *band and suspension lines.*

*7. A parachute comprising a canopy, a main load bearing means including one portion extending along an upper surface of the canopy for forming pickup areas while airborne for engagement by a pickup device and another portion extending beyond the canopy at spaced points about the canopy and converging to form suspension lines for a payload supported from the canopy while airborne, and a secondary load bearing means including an endless member extending in a circumferential arrangement on the canopy for forming further pickup areas while airborne and extending in an over and under relation at spaced points of interconnection along its lengthwise extent to portions of said main load bearing means so that when said main and secondary load bear-*

*ing means is supported from above the weight of said payload is distributed between said spaced points of interconnection along said main and secondary load bearing means, said load bearing means being of a strength capable of supporting the payload when engaged and carried by air recovery forces from above.*

*8. A parachute as set forth in claim 7 wherein said canopy is of generally square shaping.*

*9. A parachute as set forth in claim 8 wherein said endless member is of generally square shaping.*

*10. A parachute as set forth in claim 9 wherein said suspension line portions extend from at least each of the corners of said canopy.*

*11. In a parachute system for carrying a suspended pay load which includes an auxiliary parachute for use in aerial recovery of the payload prior to such recovery and a main parachute for supporting the pay load prior to recovery, the improvement comprising an auxiliary parachute having a canopy, a first load bearing and reinforcing means of a strength capable of supporting the payload when engaged and carried by recovery forces from above mounted on the canopy including a band in a circumferential arrangement and extending in adjacent relation with the outer edge portion thereof for engagement by a pickup device, converging suspension lines attached to said band at spaced points along its lengthwise extent and arranged for attachment to a pay load distant from the canopy, said load bearing and reinforcing means including portions between said suspension lines when a pay load is supported in an airborne condition whereby a pickup device carried in a depending manner from a recovery aircraft can readily engage the first load bearing and reinforcing means, and a second load bearing and reinforcing means of a strength capable of supporting the payload when engaged and carried by recovery forces from above including an endless member extending in a circumferential arrangement on the canopy for forming further pickup areas and extending in an over and under relation at spaced points of interconnection with said first load bearing and reinforcing means, said second load bearing and reinforcing means having portions being disposed on said canopy at an elevation above said first mentioned reinforcing means while airborne for engagement by said hook pickup device.*

*12. In a parachute system for carrying a suspended pay load which includes an auxiliary parachute for use in aerial recovery of the pay load and a main parachute for supporting the pay load prior to such recovery, the improvement comprising an auxiliary parachute having a generally square canopy, a reinforcing member mounted about the periphery of the canopy for engagement by a hook pickup device carried by a pickup vehicle, downwardly converging suspension lines attached at one end to said reinforcing member at the corners of said canopy and attached at the other end to a pay load supporting line, said canopy including archways formed by the sides thereof when a pay load is supported due to the corner connections of said suspension lines whereby a hook pickup device can readily contact the sides of said canopy and thereby engage the peripheral reinforcing member, said peripheral reinforcing member and the extension thereof forming two of the suspension lines including auxiliary load loops attached thereto for engagement with the winch machinery carried by the pickup aircraft.*

*13. In a parachute system for carrying a suspended pay load which includes an auxiliary parachute for use in aerial recovery of the payload and a main parachute for supporting the pay load prior to such recovery, the improvement comprising an auxiliary parachute having a generally square canopy, a reinforcing member mounted about the periphery of the canopy for engagement by a hook pickup device carried by a pickup vehicle, downwardly converging suspension lines attached at one end to said reinforcing member at the corners of said canopy and attached at the other end to a pay load supporting line, said canopy including archways formed by the sides thereof when a pay load is supported due to the corner connections of said suspension lines whereby a hook pickup device can readily contact the sides of said canopy and thereby engage the peripheral reinforcing member, the auxiliary parachute having lift characteristics in excess of the lift characteristics of the main parachute for assuring that the auxiliary parachute will be disposed above the main parachute whereby the pickup hook may be engaged therewith without any danger of the pickup aircraft entangling with the main parachute.*

References Cited

The following references, cited by the Examiner, are of record in the patented file of this patent or the original patent.

UNITED STATES PATENTS

| | | | |
|---|---|---|---|
| 2,053,342 | 9/1936 | Knight | 244—145 |
| 2,970,795 | 2/1961 | Gold | 244—142 |
| 2,974,913 | 3/1961 | Steinthal | 244—145 |
| 2,980,371 | 4/1961 | Finney | 244—152 |
| 3,228,635 | 1/1966 | Hughes et al. | 244—145 |
| 2,096,520 | 10/1937 | Knight | 244—145 |
| 2,942,815 | 6/1960 | Gross et al. | 244—137 |
| 3,137,465 | 6/1964 | Mulcahy | 244—142 |

FOREIGN PATENTS

| | | |
|---|---|---|
| 562,279 | 10/1923 | France. |
| 492,140 | 9/1938 | Great Britain. |

MILTON BUCHLER, Primary Examiner

T. W. BUCKMAN, Assistant Examiner

U.S. Cl. X.R.

244—137

PO-1050
(5/69)

UNITED STATES PATENT OFFICE
CERTIFICATE OF CORRECTION

Patent No. RE. 26,865 Dated April 21, 1970

Inventor(s) Otis B. Ferguson

It is certified that error appears in the above-identified patent and that said Letters Patent are hereby corrected as shown below:

In the heading to the printed specification, lines 4 and 5, "Recovery Research Systems, Inc." should read -- Recovery Systems Research, Inc. --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents